G. R. HARTMAN.
Bee Hive.
No. 32,769. Patented July 9, 1861.
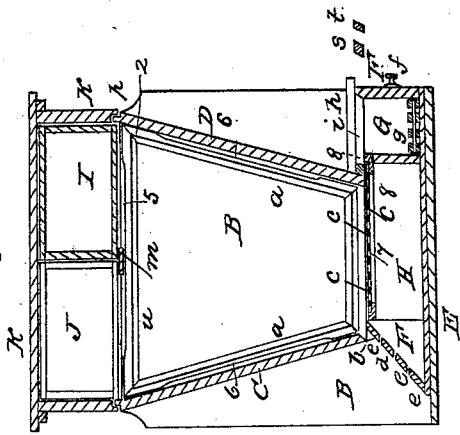
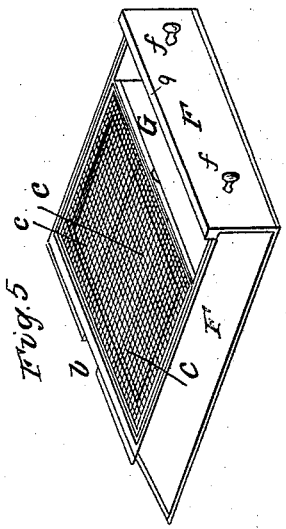
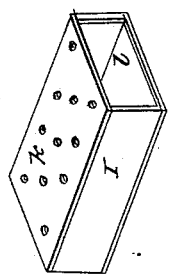
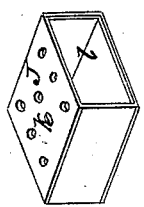
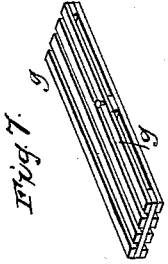
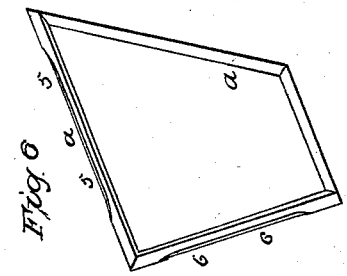
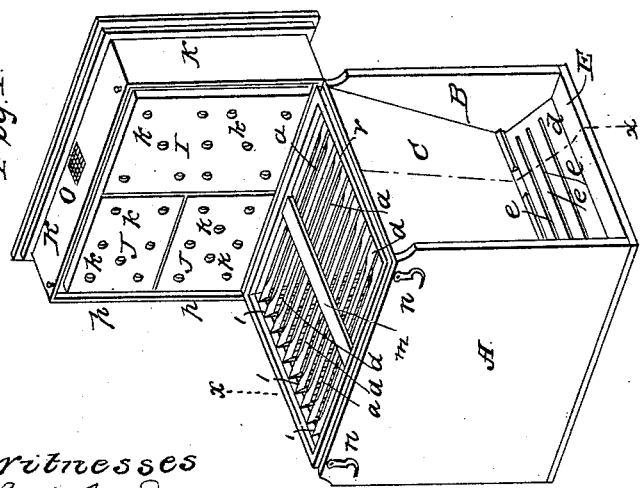
Witnesses
Inventor
Geo. R. Hartman

UNITED STATES PATENT OFFICE.

GEORGE R. HARTMAN, OF FORT WAYNE, INDIANA.

BEEHIVE.

Specification of Letters Patent No. 32,769, dated July 9, 1861.

*To all whom it may concern:*

Be it known that I, GEORGE R. HARTMAN, of Fort Wayne, in the county of Allen, in the State of Indiana, have invented certain new and useful Improvements in Beehives; and I do hereby declare that the following is a full and exact description thereof, reference being had to the accompanying drawings, making part of this application.

My invention relates to certain improvements in the construction of bee hives and consists in the employment, in combination with a box having its front and rear sides converge toward the bottom, of a series of trapezoidal removable comb frames arranged and operating as will be hereinafter fully described: whereby the bees are brought nearer together in the center of the hive.

My invention further consists in the combination with the sliding feed and miller, or moth drawer, of a removable frame covered with wire gauze or its equivalent, the whole arranged and operating as and for the purposes to be explained.

My invention further consists in making the front of the feed drawer inclined, or beveled as hereinafter described in combination with the openings for the decoy and entrance of the miller as will be presently explained.

My invention further consists in enlarging or contracting the entrance for the bees, by means of strips to be placed alongside the lid of feed drawer as hereinafter fully described.

To enable those skilled in the art to make and use my invention, I will proceed to describe the construction and operation of my improved hive referring by letters to the accompanying drawings forming part of this specification and in which—

Figure 1. is a perspective view of my new construction of hive. Fig. 2. is a vertical section at line $x, x$ Fig. 1 with upper case down in its normal position. Fig. 3. is a perspective view of one of the honey boxes. Fig. 4. is a similar view of another smaller honey box. Fig. 5. is a perspective view of the miller, or moth drawer and feed box withdrawn from the rest of the apparatus. Fig. 6. is a detail perspective of one of the comb frames and Fig. 7. is a perspective view of feed float.

In the different views the same character indicates the same part of the apparatus.

A and B, are the two sides and C, and D, the front and rear of the hive and E, its bottom. The front and rear it will be seen from Figs. 1 and 2, converge or are inclined toward each other at their lower edges so that the space in the hive is trapezoidal to suit the comb frames $a$. These frames $a$, (the shape is clearly illustrated at Fig. 6) are so shaped as to be retained by notches cut in the strips 1, 2, 3, and are arranged in parallel planes, leaving about a quarter of an inch between them; the tops and sides of these comb frames $a$, have their edges cut away as illustrated at 5 and 6 (see Figs. 2 and 6) so as to allow the free passage of the bees from one comb to another, while the bottoms of said comb frames are arranged about one quarter of an inch distant from the top of the miller drawer as seen at 7, Fig. 2.

F, is the miller or moth and feed drawer, the shape of this drawer is clearly illustrated in the drawings. It is provided with knobs $f, f$, and slides freely in its bearings, filling all the space between the sides A, B, and the bottom edges of C, and D, and the bottom board E. The front end of said drawer protrudes in an inclined form as seen at $d$, beyond front C, of hive and said inclined portion $d$, on which the bees ascend to the entrance $b$, has cut in it three slots $e, e, e$ about an eighth of an inch wide, which serve as a decoy, and entrance of the miller, or moth, but which are not large enough for the bee to enter. The drawer F, is divided into two compartments G, and H, (see Figs. 2 and 5) the former of which is smallest and is a feed box and is provided with a float $g$, (see Figs. 2 and 7,) to prevent the bees when feeding, from sticking fast to the honey. The latter is the miller, or moth drawer, and is covered with a frame of wire gauze $c$, the meshes of which are sufficiently fine to prevent the moths getting into the hive. This frame $c$, may be readily removed when the drawer is taken out for the purpose of killing the moths.

$i$ is a lid which covers the rear portion of the drawer F, and the edges of which are beveled to fit the taper of side D, and back end of drawer F. (See Fig. 2.)

$s$ and $t$, are two strips of different widths to be inserted in front of lid $i$, as will be presently explained, to regulate the capacity of the entrance $b$, at the front end of the drawer.

I, J, are boxes for collecting the surplus honey, the form and arrangement of these boxes is clearly shown, they are pierced by numerous holes to admit the bees from the frames and each one has one side of glass as seen at $l$, so that it can be readily known when they are filled with honey. These boxes I, J, rest on their outer edges on the frames $a$, and are supported (where the frames $a$, are cut away) by a cross piece $m$, laid on the frames $a$, as shown at Figs. 1, and 2.

K, is the top box or case which incloses the honey boxes I, J, and is fastened down by hooks $n$, or in any other desirable manner; said case K, fits closely over the top of the hive by means of a groove $p$, fitting over the projecting strips $r$, and is furnished with a ventilator at $o$.

The entrance $p$, is regulated in the following manner: As before mentioned the drawer F, slides freely in its bearings, its lid $i$, is held down, and itself retained by the wedged shape keys $h$. When the largest strip $s$, is inserted in front of lid $i$, as seen at Fig. 2, and the lid and strip forced up against the hive (as seen) at the point 8, the opening at $b$, will be one quarter of an inch—now if the strip $s$ be taken out and in lieu thereof the strip $t$ be inserted and the drawer shoved in, the opening at $b$, will be exactly five thirty seconds of an inch, and if this strip $b$, be taken out and the drawer forced in till edge of lid $i$, comes in contact at the point 8, then the opening $b$, will be entirely closed. When the smaller strip $t$ is used the opening must be exactly 5/32, so that the loaded worker will be admitted, but not the queen.

When feeding the lid $i$, is removed (and also the strips) and the drawer F, shoved clear under till the rear edge 9, comes in contact with point 8 when the bees can plumb down to the honey into the feed drawer, where they are not liable to be chilled.

It will be understood that by making the hive of the form shown the bees can better keep their brood warm than when in an oblong form of box. By the arrangement of the miller, moth and feed drawer in the manner described, the bees are not liable to be chilled when feeding, and the miller drawer need be cleaned out only once in two or three weeks since no moth can get from the drawer into the hive above. It will be seen that by the employment of the removable wire gauze cover $c$, the trimmings and waste from building combs will fall through this wire cloth into the miller drawer beneath, and also that the cloth $c$, can be readily removed to examine the drawer. The entrance for the bees being only about two and a half inches long and constantly guarded by them while there are three entrances $e$, for the millers extending the whole width of the hive, it is almost certain that the millers and moths will get into the drawer and not into the hive—while the drawer can be withdrawn from the hive and cleaned without disturbing the bees.

It will be seen how desirable the method of feeding already described is, for the bees can plumb directly down into the feed drawer and will not be chilled as when feeding outside of the hive, while during the feeding they are ventilated by the wire gauze in front and no other bees can possibly enter to rob the hive. It will be understood that great advantages arise from the method of regulating the capacity of the entrance $b$, such as the prevention of the escape of the queen while the workers can freely pass and the allowance to the drones to escape when desired and easy method of preventing their reëntrance. The trapezoidal form frame it will be seen avoids the difficulties of both the square and triangular forms—it not leaving the vacant corners of the one, or having the compression of the other.

Having described the construction and operation of my invention what I claim as new and desire to secure by Letters Patent is—

1. The employment in combination with the box A, B, C, D, of the trapezoidal removable comb frames $a$, the whole arranged and operating as described for the purposes set forth.

2. In combination with the sliding drawer F, the removable wire gauze frame $c$, arranged and operating as described for the purpose set forth.

3. Making the front of drawer F, beveled at $d$ in combination with the decoy entrances $e$, $e$, $e$, as described for the purpose set forth.

4. The peculiar manner described of regulating the entrance for the purposes substantially as described.

In testimony whereof I have hereunto set my hand and affixed my seal this thirteenth day of March 1861.

GEO. R. HARTMAN. [L. S.]

Witnesses:
 Wm. W. Casson,
 I. W. Hayden.